INVENTORS.
CHARLES E. SEARIGHT
EZRA M. ALEXANDER
JOHN R. RYAN
STEVEN H. BRASFIELD

BY: Merriam, Smith & Marshall
ATTORNEYS

United States Patent Office 3,560,074
Patented Feb. 2, 1971

3,560,074
95% TITANIUM DIOXIDE GLASS SPHEROIDS
Charles E. Searight, Ezra M. Alexander, John R. Ryan, and Steven H. Brasfield, Jackson, Miss., assignors to Cataphote Corporation, Jackson, Miss., a corporation of Ohio
Continuation of application Ser. No. 405,925, Oct. 23, 1964. This application Oct. 21, 1968, Ser. No. 769,433
Int. Cl. G02b 5/12
U.S. Cl. 350—105      5 Claims

ABSTRACT OF THE DISCLOSURE

Disclosed is the production of glass having at least a 75% by weight equivalent content of titanium dioxide. The glass as small spheres is useful as retroreflective lens for traffic marking surfaces and other uses, wherein the glass spherical elements or beads contain greater than 75% by weight of titanium dioxide and are suitable as retroreflective lens elements.

---

Figure 1:
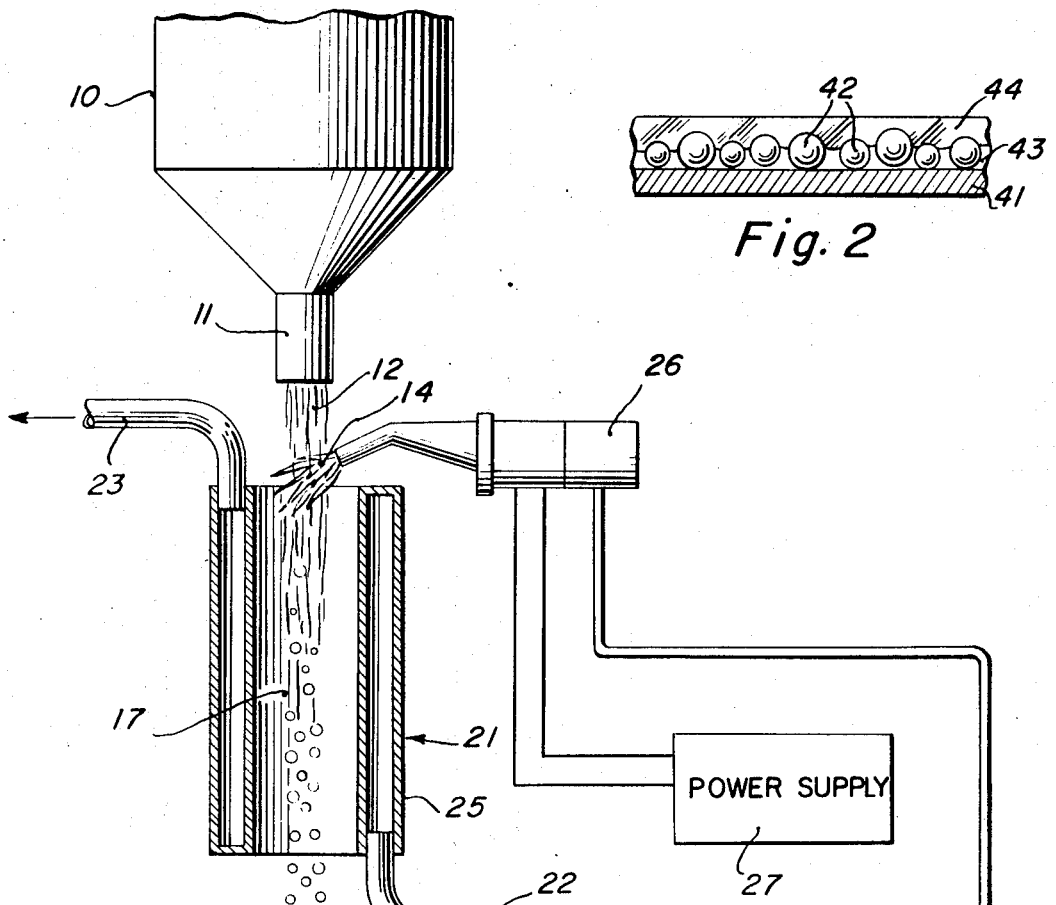

This application is a continuation of our copending application Ser. No. 405,925, filed Oct. 23, 1964, now abandoned.

This invention relates to the production of glass, particularly small glass spherical elements or beads used as lens elements for focusing and returning incident light to its source.

Small glass beads are used as retroreflective optical elements to refract light rays from a source, such as headlamps of an automobile driven by an observer, to an average focal point on the face of the bead adjacent a reflector, such as a sign, to concentrate the light. The concentrated light is then reflected back through the glass bead so that the majority of the brilliant beam of reflected light returns to its source. These is some coning of the reflexed light beam such that an observer, at a slightly different angle from the light source, observes the reflexed light from all the glass beaded surface of a sign as a brilliant illumination.

The sizes of the glass beads or spheres used as retroreflective optical elements range from a fraction of a micron to higher sizes such as up to 0.25 inch diameter. Normally, however, the glass beads are not larger than 2 mm. in diameter and generally are much smaller. In use, the beads are often bonded to one face of a reflecting surface with the other face of the beads exposed to light rays.

A wide variety of glass compositions has been used in the past to make retroreflective glass beads. Most of the glasses, however, have much lower refractive indices than are desired in beads used as retroreflective optical elements. While glasses of higher refractive indices can be produced, they are generally expensive and therefore what is needed is a relatively inexpensive easily made glass bead having a high refractive index.

Although many glasses employ titanium dioxide as an ingredient because it has good optical properties in glasses, particularly because it has a high index of refraction (namely of the order of 2.9 with respect to the d-line of sodium for the rutile form), no glasses have been apparently produced in which the content of titanium dioxide is greater than 75% by weight. It has not been possible to make glasses that have more than 75% by weight of titanium dioxide by the prior art procedures of furnace and refractory technology since the compositions could not be melted, fined and vitrified to produce the desired glasses. Furthermore, even in producing glasses up to 75% by weight of titanium dioxide, one or more fluxing agents have been needed to melt, fine and form vitreous glasses containing such amounts of titanium dioxide using conventional prior art furnace and refractory technology.

It has been discovered according to the present invention that beads or spheroidal lens elements which contain the chemical equivalent of more than 75% by weight of titanium dioxide can be produced by subjecting small solid particles of titanium dioxide to sufficient heat to melt the particles and thereby cause them to become molten spheroids and then cooling the resulting spheroids into solid beads. The beads are suitable as retroreflective lens elements.

To melt particles which are more than 75% by weight of titanium dioxide requires the utilization of temperatures substantially higher than are used in conventional glass technology.

Various means may be employed to heat the solid particles of titanium dioxide sufficiently high to cause them to melt. Thus, there can be used the flame produced from an acetylene torch, the so-called combex-ADL burner which utilizes a low current, high voltage AC electrical discharge superimposed on the combustion energy of a hydrocarbon fuel and oxygen mixture, or the heat may be obtained by using a plasma flame or even an electrical arc can be used. However, a plasma flame is particularly useful.

A plasma flame is one comprising "plasma," i.e., material which is in energy state above that which exists in the gaseous state, being further characterized in that at least some of the atoms of material have been depleted of some of the electrons which they normally possess in the free state. Plasma flame temperatures up to 60,000° F. can be readily obtained. Although the invention can utilize a plasma flame, it should be understood that the method or means used to generate such a flame does not per se constitute part of the invention. Suitable devices for producing a plasma flame jet are known. As an example, U.S. Pat. No. 2,960,594, which issued on Nov. 15, 1960, to M. L. Thorpe, describes both the theoretical and practical aspects of suitable plasma flame generators. Equipment satisfactory for use in the present invention is commercially available.

Figure 2:
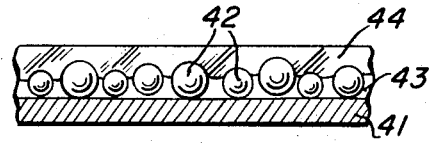

The invention will now be described further in conjunction with the accompanying drawing in which:

FIG. 1 depicts schematically a typical embodiment of apparatus which can be used in carrying out the method of the invention; and FIG. 2 depicts a typical retroreflective device in which the beads of titanium dioxide made in accordance with the method of the invention can be used.

The apparatus depicted in FIG. 1 comprises a hopper 10 containing a mass of titanium dioxide particles. The hopper has port 11 communicating therewith from which the titanium dioxide particles can freely flow downwardly as a stream 12 of particles under the influence of gravity. As the stream 12 falls, it passes transversely across the orifice 14 of a plasmajet generator 26 which is provided with suitable power supply 27 and gas supply 28 for producing a plasma flame.

Under the influence of the plasma flame emerging from the orifice 14 of the generator 26, the stream of solid titanium dioxide particles is heated, melted and spheroidized into spheres 17 of molten glasseous titanium dioxide which cool during their free fall to a suitable container 18 where they are collected. The distance through which the subdivided particles of hot molten titanium dioxide glass are allowed to fall should be sufficient to permit the molten spheres to become solid before striking any object which might tend to distort them. Alternatively, a stream of cooling air 30 can be caused to pass through the falling particles in order to hasten solidification.

Another suitable method (not illustrated) for feeding the particles of titanium dioxide into the plasma involves the use of a powder feed system of a type known to those skilled in the art. In such a system, a supply of particles of the appropriate size are charged to a hopper, from which they are fed by means of a carrier gas under low pressure into the center of the stream of plasma. The carrier gas is usually nitrogen, although other gases can also be used.

The temperature of the plasma flame used must be high enough to melt the titanium dioxide particles. Useful temperatures are typically in the range from about 3,500° F. to about 12,500° F., which upper limit is usually sufficient to spheroidize into glass bead particles which are from above 75% to 100% by weight titanium dioxide. If necessary, however, the upper limit can readily be increased to temperatures such as up to 30,000° F. or even higher by suitable selection of the gas used in the plasma generator and the addition of sufficient electrical energy to achieve this temperature, as will be apparent to those skilled in the art.

It is sometimes desirable to retard heat loss from the plasma flame to facilitate melting the titanium dioxide particles. One such suitable heat retaining and localizing apparatus is shown in the drawing and comprises a double walled cylinder 21 through the annular space of which cooling water is supplied by means of entrance pipe 22 and withdrawn through exit pipe 23. The stream of titanium dioxide particles passes through the cylinder along its axis while the plasma flame is injected tangentially into the cylinder thereby creating a downwardly moving vortex. This heating system can be used to produce practically any desired temperature. The temperature created within cylinder 21 may be so high in fact that the function of the cooling water stream supplied by pipe 22 is to prevent melting or heat deformation of the material of which the cylinder is made, suitably a metal such as copper.

The gases which are suitable for use in the plasma generator in accordance with the invention are generally the inert gases such as nitrogen, argon, and helium or various mixtures thereof. The choice of gas is outside the scope of this invention and a suitable selection will be apparent to one skilled in the art.

Although particles which are more than 75% by weight of titanium dioxide can be vitrified according to this invention and useful glasses thereby obtained, such as glass beads, the invention is particularly useful in making glasses from commercially available titanium dioxide whether in the rutile, anatase or brookite form. Commercially available titanium dioxide is readily obtained of 95% or higher purity, with 98% purity being quite common. It is such materials which find great usefulness in this invention since glasses made therefrom have high indices of refraction, with indices of 2.7 or higher being common.

While it is advisable to use particles which are almost entirely titanium dioxide, there can also be obtained useful glasses in which the titanium content is considerably less, but above 75% by weight. Thus, particles having 75% titanium dioxide fused with a wide variety of inorganic oxides such as lead oxide, barium oxide, magnesium oxide, silica oxide, calcium oxide, antimony oxide, molybdenum oxide and aluminum oxide and mixtures of these and other oxides can be made into glasses according to this invention. Simple mixtures of titanium dioxide with such oxides do not function well in making the glasses. The titanium dioxide and one or more of the other oxides should first be fused together into a homogeneous mass having more than 75% titanium dioxide and then crushed into small particles for vitrification.

The particles used in the invention, particularly for making glass beads, should be such that upon melting and spheroidization, beads are obtained having an average diameter less than 1 mm. (1,000 microns). Better results are obtained when the particles give beads less than 500 microns average diameter, and desirably less than 200 microns and advisably less than 75 microns for substantially pure titanium dioxide.

The particles, once molten, should be maintained free of contact with other molten particles to prevent consolidation thereof and the formation of larger beads. The molten particles should also be kept out of contact with other surfaces until they are solidified to preserve their spheroidal shape.

Beads produced according to this invention are colorless although if some reduction of titanium dioxide occurs they can be colored from a trace of blue to almost black.

The beads provided herewith can be used for all the purposes for which prior art beads have been employed, including highway marking stripes and signs of all types.

The following examples are presented to illustrate the invention. In each case, the product comprised glass particles suitable for use in making retroreflective sheeting materials.

EXAMPLE 1

Particles of glass grade titanium dioxide were passed through the flame from an acetylene torch, the particles melted, and after cooling collected as small vitreous beads. They were translucent to visible light but due to some reduction of the titanium dioxide their color ran from blue to black.

EXAMPLE 2

Particles of titanium dioxide (98% purity) were passed through a plasma flame produced using 160 Standard cubic feet of nitrogen or a nitrogen-hydrogen mixture per hour with a power consumption of about 40 k.w. giving an output of 100,000 B.t.u. per hour and a flame temperature of about 6,000° F. The particles of titanium dioxide were less than 2 mm. in diameter (after spheroidization by the plasma flame). After the molten spheroids of titanium dioxide were produced they were cooled in air prior to contacting any surfaces. The resulting glass beads of at least 98% titanium dioxide were vitreous but slightly colored due to reduction of some of the titanium dioxide to the lower valence titanium monoxide (TiO) thereby giving a blue color to the beads.

EXAMPLE 3

An apparatus was arranged as shown in the drawing attached hereto using a 4 inch diameter copper tube of high strength to form the radiant wall into which the plasma flame was projected and through which titanium dioxide particles were fed. The pipe was 18 inches in length. Appropriate water cooling was provided by enclosing the tube in a larger pipe and sealing off the space between the two pipes as shown in the drawing and also by providing inlet and exit water pipes.

A plasma flame was employed utilizing nitrogen gas at 15 cu. ft. per hour giving a continuous enthalpy of 60,000 B.t.u./lb. and a flame temperature of 26,000° F. At about 10% efficiency for heat transfer the plasma flame was calculated sufficient to spheroidize about 12 lbs. of titanium dioxide per hour.

Twenty parts of calcium oxide and eighty parts of titanium dioxide were melted and fused together using a conventional glass furnace and refractory. After fusion the calcium titanate was withdrawn from the furnace into a water bath wherein it was cooled. The cooled fusion product was then crushed to particle sizes less than 2 mm. average diameter and then dropped by means of a hopper as shown in the drawing through the plasma flame to melt the particles. The particles were then cooled and collected as small solid beads or spheroidal elements. The resulting calcium titanate beads had an index of refraction no less than 2.5. An oxygen purge was used in the collecting vessel in order to prevent reduction of the glass during the bead forming and cooling operation.

Instead of nitrogen other gas can be used in the plasma, such as hydrogen, argon, helium, neon and krypton.

A typical retroreflective device in which beads made in accordance with the invention can be used is shown in FIG. 2. As there depicted, the device comprises a reflective back sheet 41 having attached thereto a layer of glass beads 42 which are held in position by means of a suitable transparent binder 43. Covering the top face of the glass beads is a suitable transparent film 44 having a flat top surface. Devices of this type are described in U.S. Pat. No. 2,407,680 issued Sept. 17, 1946. The optimum effective index of refraction for such a device is known to be about 1.9, which value represents the ratio of the index of refraction of the beads to the index of refraction of the transparent top film. The relatively high index of refraction of the beads made in accordance with the invention, which can be as high as 2.9 or greater, thereby renders feasible the use of commercially available transparent films having excellent physical properties and high transparency, such as polymethylmethacrylate which has an index of refraction of about 1.5, and other methacrylate polymers having values down to about 1.45.

Various changes and modifications of the invention can be made and, to the extent that such variations incorporate the spirit of this invention, they are intended to be included within the scope of the appended claims.

What is claimed is:

1. Translucent glass spheroids of less than 2 millimeter average diameter, the ingredients of which contain more than about 95% by weight of titanium dioxide.

2. Transparent glass spheroids of less than 1 millimeter average diameter, the ingredients of which contain more than 95% by weight of titanium dioxide.

3. Glass spheroids of less than 1 millimeter average diameter, the ingredients of which consist essentially of titanium dioxide.

4. A retroreflective device comprising a sheeting material having affixed to at least one surface thereof small glass spheroids which average less than 1 millimeter in diameter, the ingredients of which glass contain more than about 95% by weight of titanium dioxide and a transparent film having a flat outer face overlying said glass spheroids.

5. A retroreflective device according to claim 4, in which the ingredients of the glass consist essentially of titanium dioxide.

References Cited
UNITED STATES PATENTS

| | | | |
|---|---|---|---|
| 3,493,403 | 2/1970 | Tung et al. | 65—21X |
| 2,568,126 | 9/1951 | Keeley. | |
| 3,293,051 | 12/1966 | Searight. | |

S. LEON BASHORE, Primary Examiner

J. H. HARMAN, Assistant Examiner

U.S. Cl. X.R.

65—21, 141, 142; 106—300, 47